United States Patent [19]
Underhill et al.

[11] Patent Number: 6,016,887
[45] Date of Patent: Jan. 25, 2000

[54] LIGHTWEIGHT AND ECONOMICAL SOUND BARRIER FOR MOUNTING ON THE GROUND OR A BRIDGE

[76] Inventors: George R. Underhill, 96 Glen Oaks; Bruce T. Barit, 8410 Avonside Ct., both of E. Amherst, N.Y. 14051; Gary S. Figallo, 432 Sterling Pl., Ridgewood, N.J. 07450

[21] Appl. No.: 08/897,011

[22] Filed: Jul. 18, 1997

Related U.S. Application Data

[60] Provisional application No. 60/022,551, Jul. 19, 1996.

[51] Int. Cl.⁷ .................................................. E04H 17/00
[52] U.S. Cl. .......................................................... 181/210
[58] Field of Search ..................................... 181/210, 285, 181/286, 287, 288, 290, 294; 52/144, 145

[56] References Cited

U.S. PATENT DOCUMENTS

| | | |
|---|---|---|
| 3,898,776 | 8/1975 | Cox et al. |
| 4,092,811 | 6/1978 | Lin et al. |
| 4,136,856 | 1/1979 | Murdock . |
| 4,143,495 | 3/1979 | Hintz ........................................... 52/145 |
| 4,175,639 | 11/1979 | Wirt ........................................... 181/210 |
| 4,325,457 | 4/1982 | Docherty et al. ........................ 181/210 |
| 4,558,850 | 12/1985 | Melfi . |
| 4,566,558 | 1/1986 | Link . |
| 4,605,090 | 8/1986 | Melfi . |
| 4,674,593 | 6/1987 | McCarty .................................. 181/210 |
| 4,838,524 | 6/1989 | McKeown . |
| 4,862,992 | 9/1989 | Melfi ...................................... 181/210 |
| 4,887,691 | 12/1989 | Rotondo .................................. 181/210 |
| 4,899,498 | 2/1990 | Grieb . |
| 5,268,540 | 12/1993 | Rex ......................................... 181/210 |
| 5,272,284 | 12/1993 | Schmanski ............................. 181/210 |
| 5,426,267 | 6/1995 | Underhill ................................ 181/210 |
| 5,539,163 | 7/1996 | Anderson et al. ....................... 181/210 |

OTHER PUBLICATIONS

Manufacture's literature entitled "Span Notes". 1986.
Pictures of Miami Metro Rail Sound Barrier Built in 1986.

*Primary Examiner*—Khanh Dang
*Attorney, Agent, or Firm*—Ware, Fressola, Van Der Sluys & Adolphson LLP

[57] ABSTRACT

A lightweight and economical sound barrier includes fiber planks, each having a thin sound absorptive membrane coated on at least one side that functions as a transmission loss barrier; and a concrete barrier having H-columns for mounting the fiber planks. The H-columns are affixed to the concrete barrier by a plate mounted on the top of the concrete barrier and supported on a lower plate mounted at the bottom of the concrete barrier. The fiber planks each include precast textured slabs is composed of extra long, fine wood fibers that have been chemically processed and pressure bonded with waterproof portland cement, that is a lightweight, strong, fire retardant material with excellent acoustic properties. The fiber planks have a tongue and groove design. The fiber planks have a three layer is laminated product which is fully integrally bonded to insure a uniform, dependable bond between components. The fiber planks include up to a three and one half inches of foam treatment. The thin sound absorptive membrane is a material such as a masonry waterproofer and a masonry sealer.

7 Claims, 7 Drawing Sheets

LIGHTWEIGHT AND ECONOMICAL SOUND BARRIER FOR MOUNTING ON THE GROUND OR A BRIDGE

This appln. claims benefit of provisional appln. 60/022,551 filed Jul. 19, 1996.

The present invention relates generally to a sound barrier for mounting on the ground or a bridge.

For a fuller understanding of the nature and objects of the invention, reference should be made to the following detailed descriptions taken in connection with the accompanying drawing, not in scale, in which.

Figure 1:
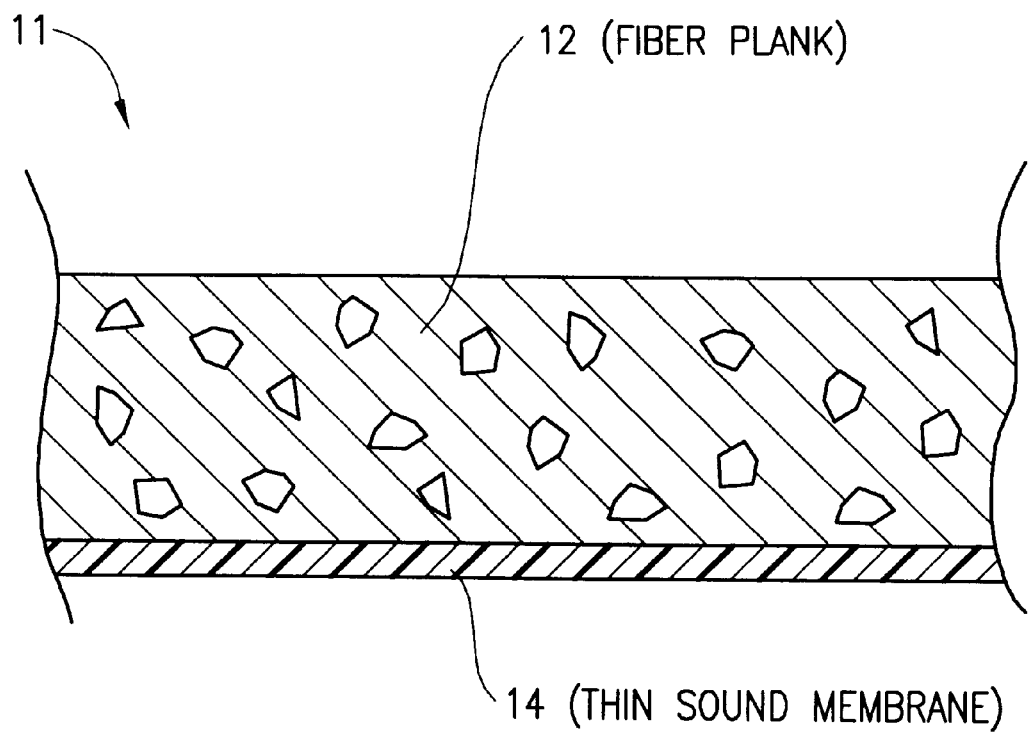
FIG. 1 is a diagram of a cross-section view of a fiber plank of a sound barrier of the present invention.
Figure 2:
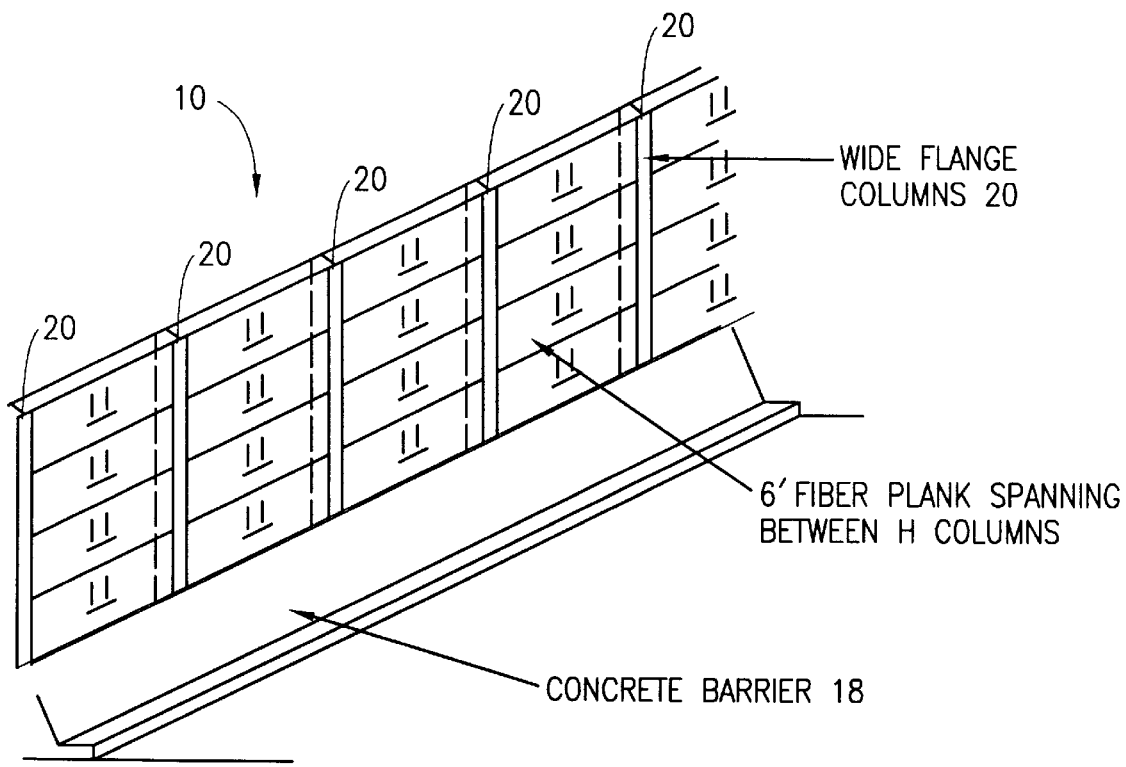
FIG. 2 is a diagram of a perspective view of a sound barrier connected to a concrete barrier of a bridge.
Figure 3:
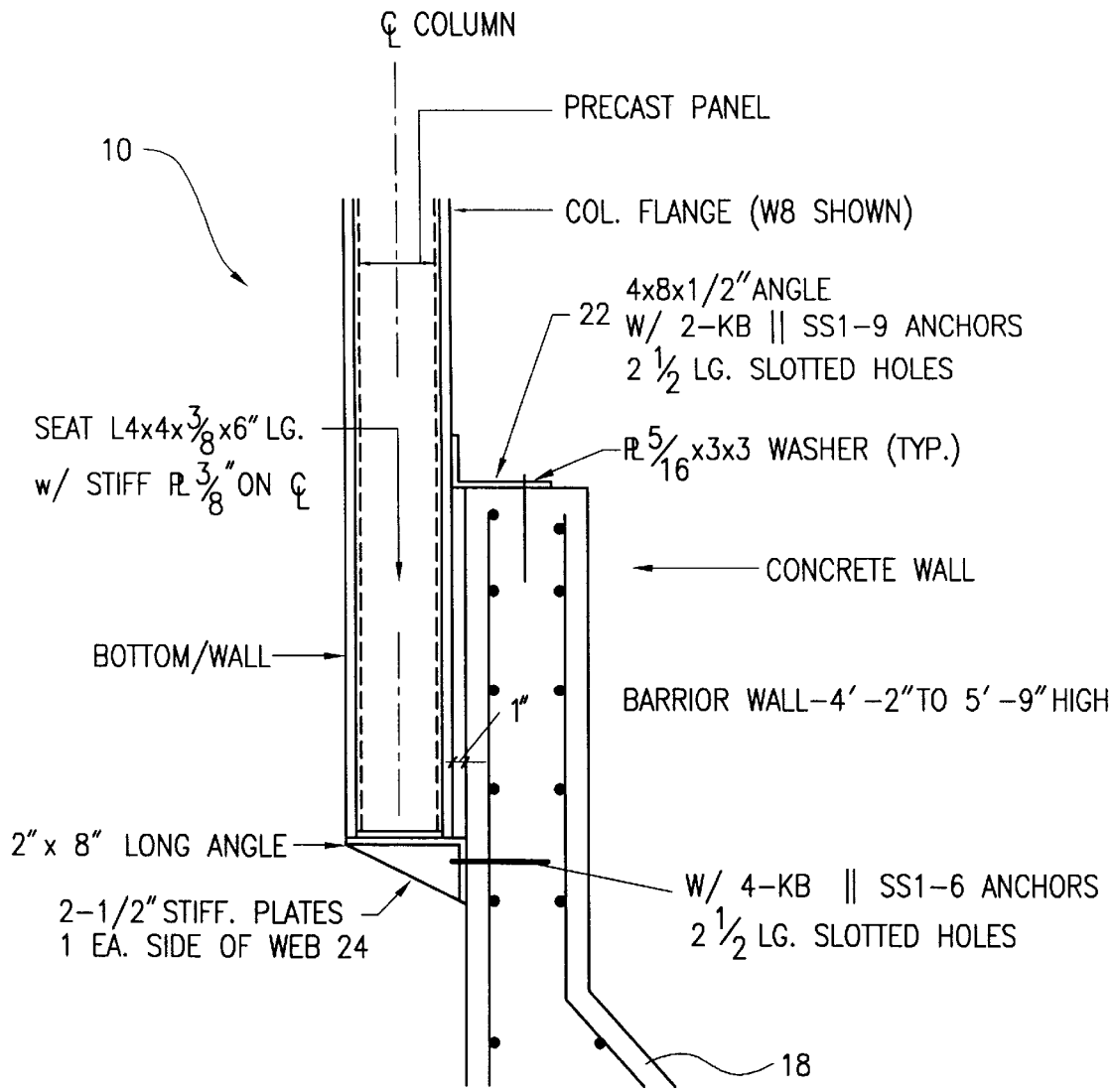
FIG. 3 is a diagram of a side view of a sound barrier connected to a concrete barrier of one embodiment of the present invention.
Figure 7:
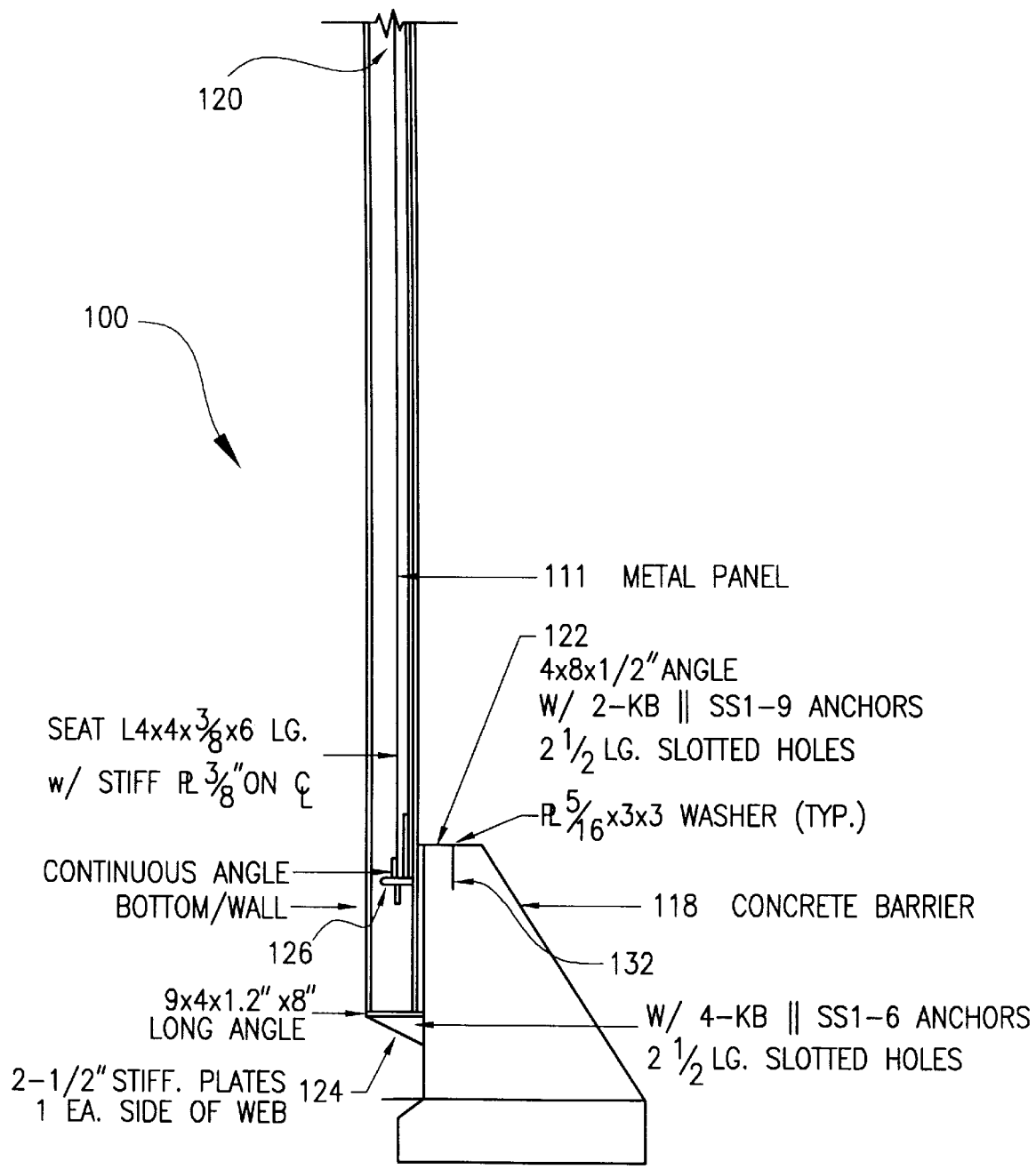
FIG. 7 is a diagram of another embodiment of a sound barrier that is the subject matter of the present invention.

FIGS. 1–4 show a lightweight and economical sound barrier generally indicated as 10 that includes at least one sound absorptive panel generally indicated as 11 having a fiber plank 12 and a thin sound membrane 14 coated on at least one side that functions as a transmission loss barrier. As shown in FIG. 2, the sound barrier 10 is mounted on a concrete barrier 18 by H-columns 20. As shown in FIGS. 3 and 7, the H-columns 20 are affixed to the concrete barrier 18 by a plate 22 mounted on the top of the concrete barrier 18 and supported on a lower plate 24 mounted at the bottom of the concrete barrier 18.

The sound barrier 10 is particularly designed for bridges where a lightweight structure is of critical importance since most bridges were not originally designed to contain sound barriers. The sound barrier 10 has a weight of less than 20 pounds per square foot, which meets and exceeds usually strict weight requirement for bridges. FIGS. 2–3 show a typical design for mounting the sound barrier 10 onto concrete barriers 18 or a concrete wall of a bridge (not shown).

The sound barrier 10 may also be mounted on the ground using the mounting structure shown and described in U.S. Pat. No. 5,426,267, hereby incorporated by reference. In such a ground mounting, the sound barrier 10 shown and described in the present application would be mounted in a similar way as the pre-stressed hollow core concrete panels in U.S. Pat. No. 5,426,267.

Figure 4:
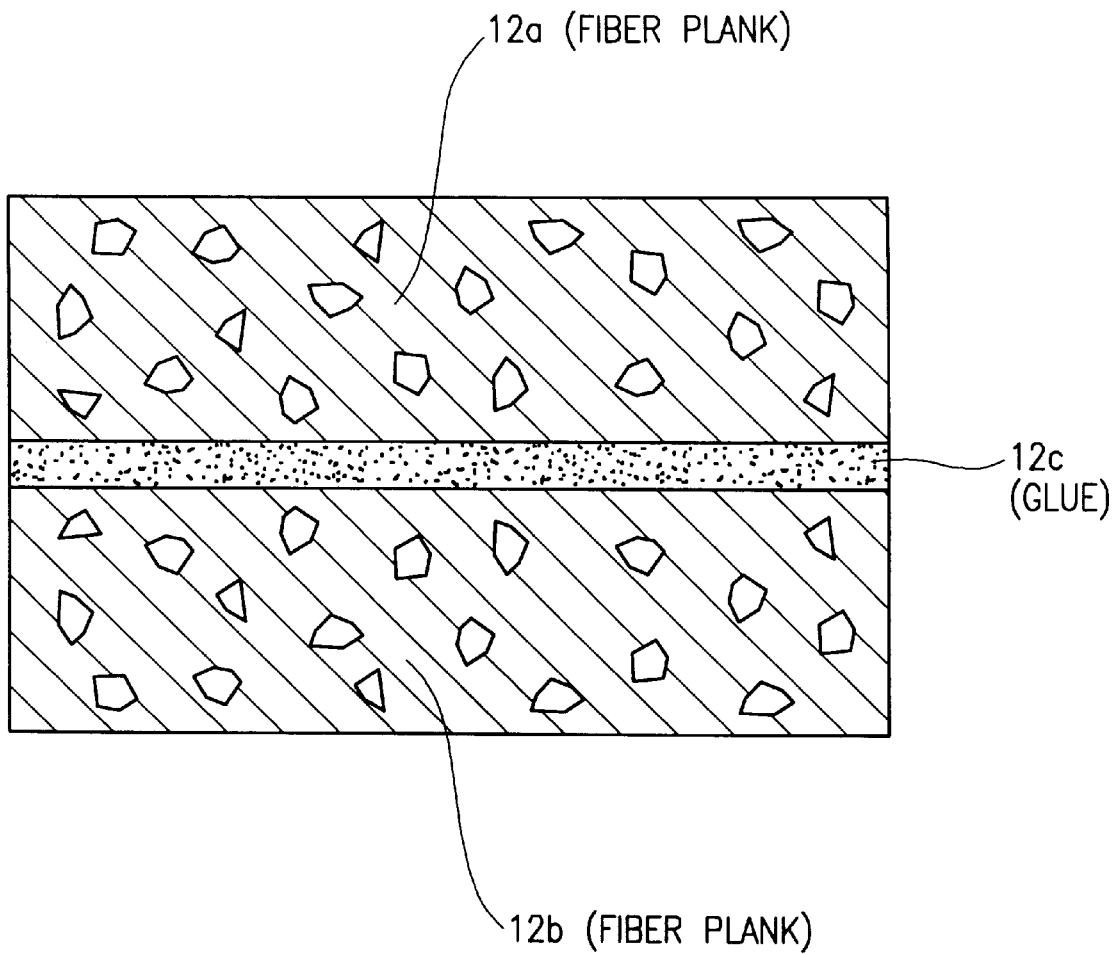
FIG. 4 is a diagram of a three later laminated design.

The fiber plank is a lightweight durable material having excellent acoustic properties. Many different types of fiber plank are well known in the art. One such fiber plank is made by Martin Fireproofing Georgia, Inc., located in Elberton, Ga. The Martin fiber plank includes precast textured slabs composed of extra long, fine wood fibers that have been chemically processed and pressure bonded with waterproof portland cement. The fiber plank is a lightweight, strong, fire retardant material with excellent acoustic properties. The fiber plank may include a tongue and groove design. The fiber plank may include a three layer laminated product which is fully integrally bonded to insure a uniform, dependable bond between components, including fiber planks 12a, 12b and glue 12c as shown in FIG. 4. Since the fiber plank is a portland cement product, it is not adversely affected by water or moisture. The fiber plank may also include up to a three and one half inches of foam treatment. The fiber plank does not contain asbestos. The scope of the invention is not intended to be limited to only the Martin product, because embodiments are envisioned using other products having similar structural and acoustic properties as the Martin product.

The thin sound membrane is a material having excellent transmission loss barrier properties. Two such materials known in the art are a masonry waterproofer and a masonry sealer made by United Gilsonite Laboratories, located in Jackson, Miss., and Sparks, N.Y. The United Gilsonite masonry waterproofer product is a ready mix masonry paint, and the United Gilsonite masonry waterproofer product is a multi-purpose masonry sealer. The United Gilsonite masonry waterproofer products are readily available at hardware stores, home centers, paint stores and lumber yards. The scope of the invention is not intended to be limited to only the United Gilsonite products, because embodiments are envisioned using other products having similar transmission loss barrier properties as the United Gilsonite products.

In one embodiment, the sound barrier has a fiber plank that is 4 inches thick and up to 12 feet long, and has a thin membrane that is either a masonry waterproofer or a multi-purpose masonry sealer coated on one side of the fiber plank. The scope of the invention is not intended to be limited to a fiber plank having these specific dimensions, because embodiments are envisioned using other dimensions.

In another embodiment, the sound barrier has two fiber planks that are each 3 inches thick and up to 12 feet long, has an adhesive for bonding the two fiber planks together, and has either a masonry waterproofer or a multi-purpose masonry sealer coated on one side of at least one of the two fiber planks. In still another embodiment the sound barrier has either a masonry waterproofer or a multi-purpose masonry sealer coated on both sides of the two fiber planks. The scope of the invention is not intended to be limited to fiber planks having these specific dimensions, because embodiments are envisioned using other dimensions.

One such adhesive known in the art is all-weather/season construction adhesive made by Pratt & Lambert Specialty Products, located in Buffalo, N.Y. The Pratt & Lambert cement-like material is a heavy duty formulation of high-strength, thermoplastic rubber, which provides a durable, weatherproof and permanent bond, far stronger than nails and lumber. The Pratt & Lambert cement-like material bonds exceptionally well to the fiber plank, even when applied to wet or frozen fiber plank. The Pratt & Lambert cement-like material has a service temperature in a range of −30 to 175 degrees Fahrenheit, has a bonding time of 0–20 minutes, and has a shear strength of greater than 600 PSI, and coverage of 39 linear feet per ¼ gallon with a ⅜" bead. The scope of the invention is not intended to be limited to only the Pratt & Lambert product, because embodiments are envisioned using other products having similar adhesive properties as the Pratt & Lambert product.

Table 1 shows a load test of a cast for a 4 inch thick fiber plank having a clear span of 140 inches, having a weight of 407 pounds, having height and width dimensions of 33 inches by 150 inches (32.08 feet$^2$), and having each bag of calcium chloride weighing 40 pounds. The table shows a load table with a relationship of the number of bags of calcium chloride to the fiber plank, and a deflection table that shows the deformation of the sound barrier design.

TABLE 1

Load Test of 4" Fiber Plank
140" clear span
1 Weight of plank - 407 lbs. =
Dimensions 33" × 150" = 32.08 sq. ft.
Loading Weights – bagged calcium chloride = 40.0 lbs.

| No. of Bags | Weight | Load | Deflections | | |
|---|---|---|---|---|---|
| | | | A | B | Avg. |
| Wt. of plank | 407 | | | | |
| 2 | 487 | | .174 | .184 | |
| 4 | 567 | | .340 | .350 | |
| 6 | 647 | | .430 | .440 | |
| 8 | 727 | | .595 | .620 | |
| 10 | 807 | | .895 | .900 | |
| 12 | 887 | | 1.020 | 1.030 | gauges |
| 14 | 967 | | 1.360 | 1.390 | still |
| 16 | 1047 | | dial gauges removed | | moving |
| 18 | 1127 | | | | slightly |
| 20 | 1207 | | | | |
| 22 | ultimate failure 22 bags | | | | |
| = | 1287 | | | | |
| = | 40 lbs/sq. ft. | | | | |

Table 2 shows a load test of a cast for a 4 inch thick fiber plank having a clear span of 140 inches, having a weight of 435 pounds, having height and width dimensions of 33 inches by 150 inches (32.08 feet$^2$), and having each bag of calcium chloride weighing 40 pounds. The table shows a load table with a relationship of the number of bags of calcium chloride to the weight of cast fiber plank, and a deflection table.

TABLE 2

Load Test of 4" Fiber Plank
140" clear span
2 Weight of plank - 435 lbs.
Dimensions 33" × 150" = 32.08 sq. ft.
Loading Weights – bagged calcium chloride = 40.0 lbs.

| No. of Bags | Weight | A | B | Avg. |
|---|---|---|---|---|
| Wt. of plank | 435 | | | |
| 2 | 515 | .130 | .103 | |
| 4 | 595 | .251 | .254 | |

TABLE 2-continued

Load Test of 4" Fiber Plank
140" clear span
2 Weight of plank - 435 lbs.
Dimensions 33" × 150" = 32.08 sq. ft.
Loading Weights – bagged calcium chloride = 40.0 lbs.

| No. of Bags | Weight | A | B | Avg. |
|---|---|---|---|---|
| 6 | 675 | .300 | .300 | |
| 8 | 755 | .450 | .450 | |
| 10 | 835 | .575 | .570 | |
| 12 | 915 | .645 | .640 | Dial |
| 14 | 995 | .820 | .810 | gauges |
| 16 | 1075 | 1.106 | .980 | still |
| 18 | 1155 | 1.150 | 1.040 | moving |
| 20 | 1235 | dial gauges removed | | slightly |
| 22 | 1315 | | | |
| 24 | 1395 | | | |
| 26 | 1475 | | | |
| 28 | 1555 | | | |
| 30 | Failure | = 1635 lbs. | | |
| | | = 50.96 lbs./sq. ft. | | |

Table 3 shows a load test of a cast for a 4 inch thick fiber plank having a clear span of 140 inches, having a weight of 323 pounds, having height and width dimensions of 33 inches by 150 inches (32.8 feet$^2$), and having each bag of calcium chloride weighing 40 pounds. The table shows a load table with a relationship of the number of bags of calcium chloride to the weight of cast fiber plank, and a deflection table.

TABLE 3

Load Test of 4" Fiber Plank
140" Clear span
3 Weight of plank-323 lbs.
Dimensions 33" × 150" = 32.08 sq. ft.
Loading Weight – bagged calcium chloride = 40.0 lbs.

| | No. of Bags | Load | Weight | Deflections | | |
|---|---|---|---|---|---|---|
| | | | | A | B | Avg. |
| Wt. of plank | ----- | | 323 | .175 | .197 | |
| | 2 | | 403 | .370 | .397 | |
| | 4 | | 483 | .550 | .570 | |
| | 6 | | 563 | .690 | .730 | |
| | 8 | | 643 | .690 | .730 | |
| 3:35 | 10 | | 723 | .760 | .800 | ← |
| | | | | | | gauges |
| 5:30 | | | | 1.169 | 1.204 | still |
| | | | | | | moving |
| Day 2 | 9:00 AM | | | 1.624 | 1.657 | slightly |
| | 4:00 AM | | | 1.709 | 1.740 | |
| Day 3 | 9:00 AM | | | 1.847 | 1.970 | |
| | Load removed | | | | | |
| | 9:00 AM | | | 1.230 | 1.360 | |

Table 4 shows a load test of a cast for two 3 inch thick fiber planks adhered back-to-back having a clear span of 140 inches, having test specification dimensions of 32 inches by 154 inches, having a top plank weight of 353 pounds, having a bottom plank weight of 341 pounds, having a total plank weight of 694 pounds, having loaded area dimensions of 33 inches by 140 inches (32.08 feet$^2$), and having each bag of calcium chloride weighing 45.7 pounds. The table shows a load table with a relationship of the number of bags of calcium chloride to the weight of cast fiber plank, and a deflection table.

TABLE 4

LOAD TEST

TWO PIECES OF 3" FIBER PLANK, GLUED BACK TO BACK
TESTED AS SIMPLE BEAM WITH UNIFORM LOAD
TESTED ACCORDING TO ASTM E196
Test specimen dimensions: 6" thick, by 164" by 32"
Loaded area: 140" by 33" = 32.08 sq. ft.
Tested on clear span of 140"
TEST SPECIMEN NO. 1

Wt. of top plant = 353 lbs.
Wt. of bottom plant = 341 lbs.
Total = 694 lbs.    Wt. per loading bag = 45.7 LBS.

| No. of Bags | Total load (plank + bags) | Deflections (inches) | | |
|---|---|---|---|---|
| | | Location A | Location B | Avg. |
| Wt. of specimen = 684 | | 0 | 0 | 0 |
| 2 | 785.4 | 0.105 | 0.096 | 0.086 |
| 4 | 876.8 | 0.22 | 0.215 | 0.2175 |
| 6 | 968.2 | 0.311 | 0.31 | 0.3105 |
| 8 | 1059.6 | 0.385 | 0.392 | 0.3885 |
| 10 | 1151 | 0.448 | 0.455 | 0.4515 |

TABLE 4-continued

| 12 | 1242.4 | 0.487 | 0.494 | 0.4905 |
| 14 | 1333.8 | 0.608 | 0.628 | 0.618 |
| 16 | 1425.2 | 0.739 | 0.704 | 0.7216 |
| 18 | 1516.6 | 0.856 | 0.89 | 0.873 |
| 20 | 1608 | 0.866 | 0.99 | 0.973 |
| 22 | 1699.4 | 1.078 | 1.17 | 1.124 |
| 24 | 1790.8 | 1.151 | 1.189 | 1.17 |
| 26 | 1882.2 | 1.291 | 1.338 | 1.3146 |
| 28 | 1973.6 | 1.439 | 1.491 | 1.465 |
| 30 | 2065 | 1.547 | 1.648 | 1.6875 |
| 32 | 2156.44 | Gauges removed | | |
| 44 | 2704.8 | Specimen failed | | |

Table 5 shows a load test for two 3 inch thick fiber planks laid back-to-back tested as a simple beam with a uniform load, having a clear span of 140 inches, having test specification dimensions of 32 inches by 154 inches, having one plank weight of 322 pounds, having another plank weight of 319 pounds, having a total weight of 641 pounds, having loaded area dimensions of 33 inches by 140 inches (32.08 feet$^2$), and having each bag of calcium chloride weighing 43 pounds. The table shows a load table with a relationship of the number of bags of calcium chloride to the weight of cast fiber plank, and a deflection table.

TABLE 5

LOAD TEST
TWO PIECES OF 3" FIBER PLANK, LAID BACK TO BACK
TESTED AS SIMPLE BEAM WITH UNIFORM LOAD
TESTED ACCORDING TO ASTM E196
Test speciman dimensions: 6" thick, by 164" by 32"
Loaded area: 140" by 33" = 32.08 sq. ft.
Tested on clear span of 140"
TEST SPECIMEN NO. 2
Wt. of plank A = 322 lbs    Wt. per loading bag = 43 LBS.
Wt of plank B = 319 lbs.
Total = 641 lbs.

| No. of Bags | Total load (plank + bags) | Deflections (inches) | | | Date | Time |
|---|---|---|---|---|---|---|
| | | Location A | Location B | Avg | | |
| Wt. of Plank = 641 | | 0 | 0 | 0 | | |
| 2 | 727 | 0.082 | 0.068 | 0.070 | | |
| 4 | 813 | 0.201 | 0.163 | 0.192 | | |
| 6 | 899 | 0.321 | 0.299 | 0.31 | | |
| 8 | 985 | 0.437 | 0.412 | 0.4245 | | |
| 10 | 1071 | 0.493 | 0.466 | 0.4795 | | |
| 12 | 1157 | 0.553 | 0.52 | 0.5366 | | |
| 14 | 1243 | 0.717 | 0.683 | 0.7 | | |
| 16 | 1328 | 0.891 | 0.855 | 0.873 | 5/30 | 4:00 pm |
| Long term loading | | | | | | |
| 16 | 1329 | 0.998 | 0.945 | 0.9716 | 5/31 | 7:15 am |
| " | " | 1 | 0.957 | 0.9786 | " | 6:16 am |
| " | " | 1.05 | 0.961 | 1.0055 | " | 10:15 am |
| " | " | 1.0g9 | 0.904 | 1.027 | " | 11:45 am |
| " | " | 1.17 | 0.972 | 1.071 | | 2:00 pm |
| " | " | 1.26 | 0.979 | 1.1146 | | 4:15 pm |
| " | " | 1.156 | 1.116 | 1.1366 | 6/3 | 7:10 am |
| " | " | 1.159 | 1.12 | 1.1395 | " | 8:30 am |
| " | " | 1.163 | 1.124 | 1.1435 | " | 8:15 am |
| Load removed | | | | | | |
| 0 | Planks = 641 | 0.998 | 0.945 | 0.9716 | 6/3 | 8:23 am |
| " | " | 1 | 0.957 | 0.9786 | " | 10:23 am |
| " | " | 1.06 | 0.961 | 1.0055 | " | 11:23 am |
| " | " | 1.09 | 0.964 | 1.027 | " | 3:20 pm |
| " | " | 1.17 | 0.972 | 1.071 | 6/4 | 6:20 am |
| " | " | 1.25 | 0.979 | 1.1146 | 6/4 | 8:00 am |

Table 6 shows a load test for two 3 inch thick fiber planks laid back-to-back tested as a simple beam with a uniform load, having a clear span of 140 inches, having test specification dimensions of 32 inches by 154 inches, having one plank weight of 329 pounds, having another plank weight of 335 pounds, having a total weight of 664 pounds, having loaded area dimensions of 33 inches by 140 inches (32.08 feet$^2$), and having each bag of calcium chloride weighing 43 pounds. Table 6 shows a load table with a relationship of the number of bags of calcium chloride to the weight of cast fiber plank, and a deflection table.

TABLE 6

LOAD TEST

TWO PIECES OF 3" FIBER PLANK, LAID BACK TO BACK
TESTED AS SIMPLE BEAM WITH UNIFORM LOAD
TESTED ACCORDING TO ASTM E196
Test specimen dimensions: 6" thick, by 154" by 32"
Loaded area: 140" by 33" = 32.08 sq. ft.
Tested on clear span of 140"
TEST SPECIMEN NO. 1

Wt. of plank A = 329 lbs.   Wt. per loading bag = 43 LBS.
Wt. of plank B = 336 lbs.
Total = 664 lbs.

| No. of Bags | Total load (plank + bags) | Deflections (inches) Location A | Location B | Avg. |
|---|---|---|---|---|
| Wt. of Plank = 664 | 0 | 0 | 0 | |
| 2 | 750 | 0.086 | 0.071 | 0.071 |
| 4 | 836 | 0.209 | 0.2 | 0.2045 |
| 6 | 922 | 0.307 | 0.306 | 0.306 |
| 8 | 1008 | 0.405 | 0.401 | 0.403 |
| 10 | 1094 | 0.46 | 0.46 | 0.46 |
| 12 | 1180 | 0.552 | 0.554 | 0.553 |
| 14 | 1266 | 0.647 | 0.545 | 0.646 |
| 16 | 1352 | 0.769 | 0.769 | 0.769 |
| 18 | 1438 | 0.872 | 0.868 | 0.87 |
| 20 | 1524 | 0.989 | 0.886 | 0.987 |
| 22 | 1610 | 1.065 | 1.06 | 1.0625 |
| 24 | 1696 | 1.226 | 1.215 | 1.2205 |
| 26 | 1782 | 1.398 | 1.389 | 1.3235 |
| 28 | 1868 | After ten minutes under load bottom board broke. | | |

Figure 5:
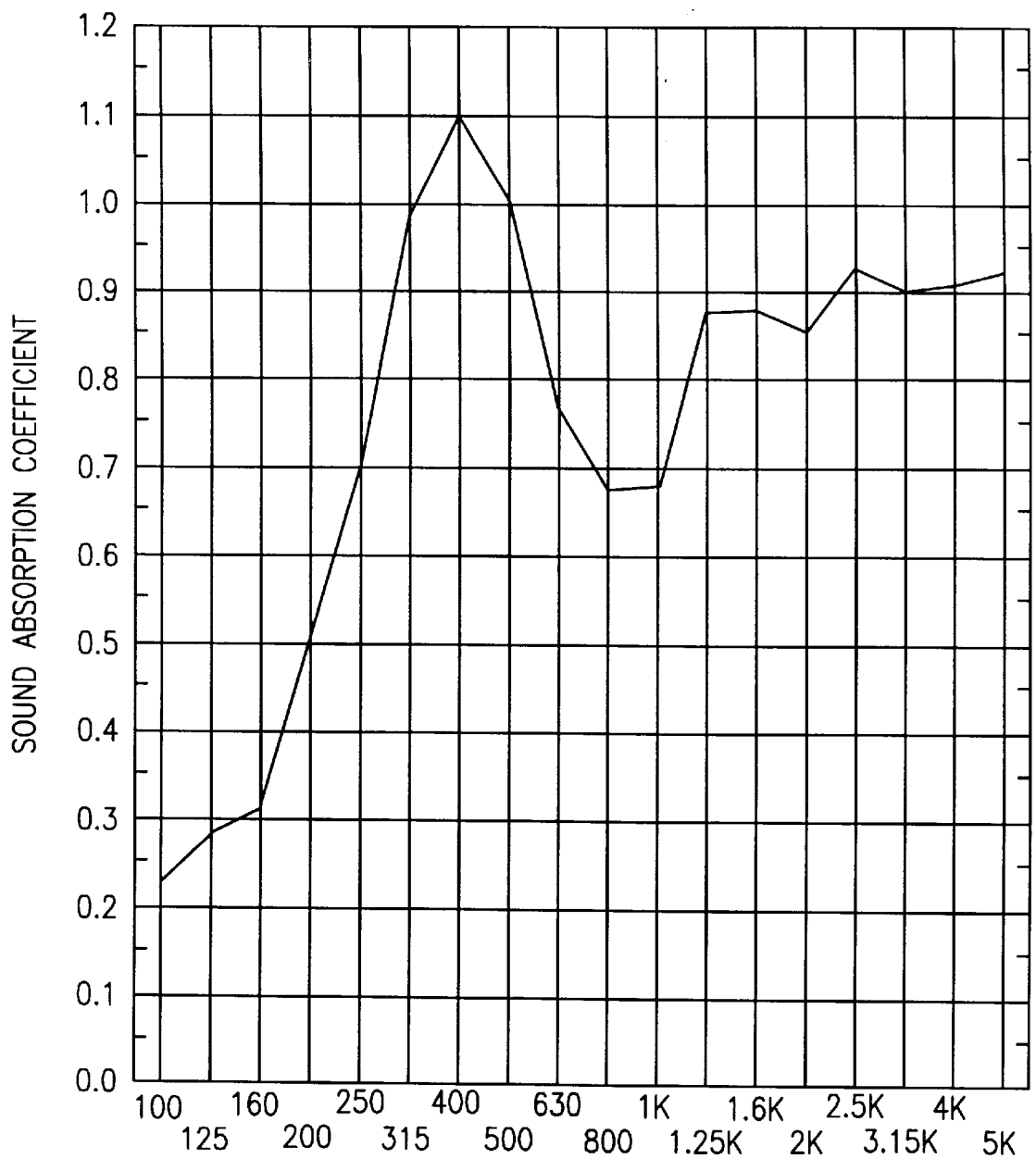
FIG. 5 shows a graph of a sound absorption report having frequency in Hertz versus sound absorption coefficient.

Table 7 shows an acoustic test to calculate an absorption coefficient for a cast of a 3 inch thick fiber plank at a room temperature of 71 degrees Fahrenheit, having dimensions of 96.5 inches×108 inches×3½ inches, having a plank weight of 860.5 pounds, having a calculation absorption coefficient area 72.4 feet$^2$. The noise reduction coefficient (NCR) was equal to 0.80. See also the sound absorption report shown in FIG. 5.

TABLE 7

MANUFACTURER: MARTIN FIREPROOFING
DESIGNATION: 3" FIBER PLANK
ROOM TEMP [F.]: 71
DIMENSIONS: 96.5 × 108 × 3.75
WEIGHT [lb]: 860.5
CALCULATE ABSORPTION COEFFICIENT
AREA [SQ. FT]: 72.4
MOUNTING: A
SPECIMEN WAS PRECONDITIONED

| ⅓ OCTAVE CENTER FREQ. (Hz) | ABSORPTION COEFFICIENT | | TOTAL ABSORPTION IN SABINS |
|---|---|---|---|
| 100.0 | 0.22728 | 0.23 | 16.46 |
| 125.0 | 0.28677 | 0.29 | 20.76 |
| 160.0 | 0.31370 | 0.31 | 22.71 |
| 200.0 | 0.51136 | 0.51 | 37.02 |
| 250.0 | 0.71620 | 0.72 | 51.85 |
| 315.0 | 0.98200 | 0.98 | 71.10 |
| 400.0 | 1.10622 | 1.11 | 80.09 |
| 500.0 | 1.00446 | 1.00 | 72.72 |
| 630.0 | 0.77367 | 0.77 | 56.01 |
| 800.0 | 0.68409 | 0.68 | 49.53 |
| 1000.0 | 0.68735 | 0.69 | 49.76 |
| 1250.0 | 0.87851 | 0.88 | 63.60 |
| 1600.0 | 0.88139 | 0.88 | 63.81 |
| 2000.0 | 0.85718 | 0.86 | 62.06 |
| 2500.0 | 0.92726 | 0.93 | 67.13 |
| 3150.0 | 0.90040 | 0.90 | 65.19 |
| 4000.0 | 0.90568 | 0.91 | 65.57 |
| 5000.0 | 0.92339 | 0.92 | 66.85 |

NOISE REDUCTION COEFFICIENT [NRC] = 0.80

Table 8 shows an acoustic test of airborne sound transmission loss. The test sample consisted of three slabs of fiber plank each measuring 48"×32"×3" assembled in the test opening between the source room and the reverberation chamber. The surface on the reverberation room side was sealed after installation with two coats of a masonry paint. The exposed face area was 24.3 ft$^2$. (2.26 square meters).

Figure 6:
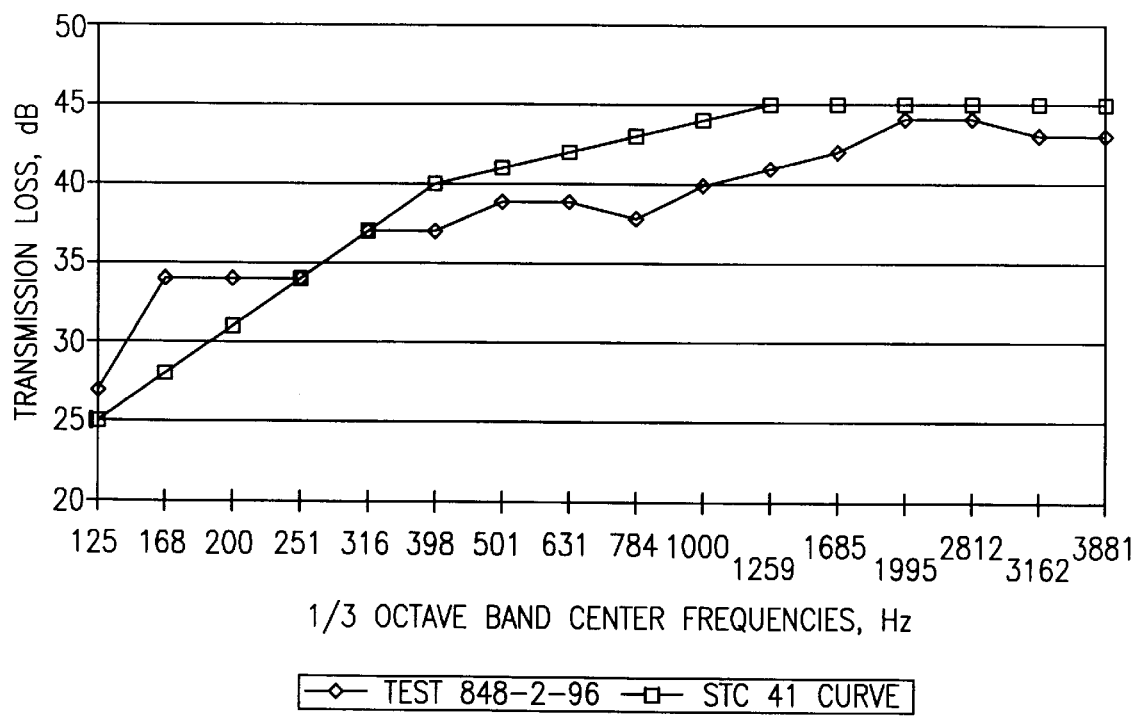
FIG. 6 is a graph of acoustic test results having ⅓ Octave band center frequency versus transmission loss.

Transmission Loss values are tabulated in Table 8 for the 18 contiguous ⅓ octave bands from 100 to 5,000 Hz. FIG. 6 is a graphical plot of the Transmission Loss values and the standard STC 41 reference curve from 125 to 4,000 Hz. STC rating be calculated per ASTM Standard E413. The NRC rating represents sound adsorption and the STC rating represents sound reflection.

No deviations from the standard were taken. The frequencies of 100 and 5,000 Hz. were included for reference only. Test results are shown for both ⅓ and full octave bands. The full octave bands were calculated from the ⅓ octave measurements in accordance with note 14 of ASTM E90. Except as noted otherwise, the measurement of Airborne Sound Transmission Loss was made using facilities, instrumentation and procedures conforming to the American Society of Testing Materials (ASTM) Standard ESO-90.

TABLE 8

| Freq. Hz | TL dB | PRECISION dB (1) | DEFIC. dB (2) |
|---|---|---|---|
| 50 | 18 | 0.51 | |
| 63 | 25 | 0.6 | |
| 79 | 28 | 0.47 | |
| 100 | 28 | 0.44 | |
| 126 | 27 | 0.31 | 0 |
| 158 | 34 | 0.39 | 0 |
| 200 | 34 | 0.39 | 0 |
| 251 | 34 | 0.32 | 0 |
| 316 | 37 | 0.28 | 0 |
| 398 | 37 | 0.23 | 3 |
| 501 | 39 | 0.18 | 2 |
| 631 | 39 | 0.07 | 3 |
| 794 | 38 | 0.22 | 5 |
| 1000 | 40 | 0.1 | 4 |
| 1259 | 41 | 0.12 | 4 |
| 1585 | 42 | 0.07 | 3 |
| 1995 | 44 | 0.09 | 1 |
| 2512 | 44 | 0.08 | 1 |
| 3162 | 43 | 0.08 | 2 |
| 3961 | 43 | 0.11 | 2 |
| 5012 | 42 | 0.1 | |
| 6310 | 45 | 0.09 | |
| 7943 | 47 | 0.07 | |

TABLE 8-continued

| Freq. Hz | TL dB | PRECISION dB (1) | DEFIC. dB (2) |
|---|---|---|---|
| 10000 | 49* | 0.09 | |
| 63 | 22 | | |
| 126 | 29 | | |
| 251 | 35 | | |
| 501 | 38 | | |
| 1000 | 39 | | |
| 1995 | 43 | | |
| 3981 | 43 | | |
| 7943 | 47 | | |
| STC (3): | 41 | | |

(*) Levels inside Receiving room between 5 and 10 dB of ambient.
Rec room levels corrected by logarithmic substraction of background noise as per ASTM E90, section 9.4.
(1) Uncertainty interval to 95% confidence of transmission loss measurements before any corrections are applied.
(2) Deficiencies from STC curve.
(3) Sound Transmission Class as described in ASTM Classification E413.

FIG. 7 shows another embodiment of a lightweight and economical sound barrier for mounting on the ground or a bridge that is the subject matter of the present invention and generally indicated as 100. The lightweight and economical sound barrier 100 includes at least one metal panel 111 that functions as a transmission loss barrier and a concrete barrier 118. The concrete barrier 118 has H-columns 120 for mounting the at least one metal panel 111. The H-columns 120 being affixed to the concrete barrier 118 by a plate mounted 122 on the top of the concrete barrier 118 and supported on a lower plate 124 mounted at the bottom of the concrete barrier 118. As shown, the metal panel 111 is fastened to the H-column 120 by a bracket 126.

In summary, the important features of the sound barrier are:

1. Post spacing at 12 feet on center without steel reinforcement.
2. Absence of steel reinforcement means no corrosion induced deterioration.
3. Use of minimum thickness paint layer to seal surface and provide transmission loss.
4. Use of the mass of the absorptive material for transmission loss barrier for low frequency sound.
5. Lightest weight panel system manufactured with concrete product.
6. Long strand fibers provide reinforcement with wood concrete panel.
7. Single sided absorptive panel without reinforced concrete layer.
8. Double sided absorptive panel without reinforced concrete layer.
9. Improved low frequency sound absorption performance in thin panel.
10. Paint layer used becomes integral part of panel, not surface applied transmission loss barrier.
11. Paint layer used is a thin membrane to enable mass of absorptive material to function as transmission loss barrier.
12. Paint layer used as a sealer as well as architectural feature to provide transmission loss.
13. Spray-on or brush-on material layer used as sealer to provide transmission loss.
14. Horizontal butt joint between absorptive panels.

Although the invention has been set forth in detail, certain changes may be made in the above construction without departing from the scope of the invention. It is intended that all matter contained in the above description or shown in the accompanying drawing shall be interpreted as illustrative and not in a limiting sense.

We claim:

1. A lightweight and economical sound barrier, comprising:
   at least one sound absorptive panel having a fiber plank and a thin sound membrane coated on at least one side that functions as a transmission loss barrier; and
   a concrete barrier having H-columns for mounting said at least one panel, said H-columns being affixed to the concrete barrier by a plate mounted on the top of the concrete barrier and supported on a lower plate mounted at the bottom of the concrete barrier.

2. A lightweight and economical sound barrier according to claim 1,
   wherein said fiber plank includes precast textured slabs composed of extra long, fine wood fibers that have been chemically processed and pressure bonded with waterproof portland cement, that is a lightweight, strong, fire retardant material with excellent acoustic properties.

3. A lightweight and economical sound barrier according to claim 1, wherein said fiber plank includes a three layer laminated product having two fiber planks with an adhesive bond therebetween.

4. A lightweight and economical sound barrier according to claim 1, wherein said thin sound membrane is either a masonry waterproofer or a masonry sealer.

5. A lightweight and economical sound barrier, comprising:
   at least one sound absorptive panel having a metal panel, that functions as a transmission loss barrier; and
   a concrete barrier having H-columns for mounting said at least one sound absorptive panel, said H-columns being affixed to the concrete barrier by a plate mounted on the top of the concrete barrier and supported on a lower plate mounted at the bottom of the concrete barrier.

6. A lightweight and economical sound barrier according to claim 5, wherein the metal panel is fastened to the H-columns by a bracket.

7. A lightweight and economical sound barrier for mounting on the ground or a bridge, comprising:
   at least one sound absorptive panel either having a fiber plank and a thin membrane coated on at least one side, or having a metal panel, that functions as a transmission loss barrier; and
   a concrete barrier having H-columns for mounting said at least one sound absorptive panel, said H-columns being affixed to the concrete barrier by a plate mounted on the top of the concrete barrier and supported on a lower plate mounted at the bottom of the concrete barrier.

* * * * *

UNITED STATES PATENT AND TRADEMARK OFFICE
CERTIFICATE OF CORRECTION

PATENT NO. : 6,016,887
DATED : January 25, 2000
INVENTOR(S) : Underhill, et. al.

It is certified that error appears in the above-identified patent and that said Letters Patent is hereby corrected as shown below:

On the title page, item [57], Abstract,
line 10, delete "is".
line 15, delete "is".

In column 1 line 21, "is a" should be --shows a-- and "later" should be --layer--.

In column 3, line 9, insert --weight of cast-- before "fiber plank".

In column 3, line 10, insert --resistance to-- before "deformation".

In column 4, line 32, delete "(32.8 feet$^2$)" and insert --(32.08 feet$^2$)--.

In column 4, Table 3, Column 'Avg.', line 52, delete "←" and insert --←--.

In column 5, Table 4, line 22, delete "Wt. of specimen = 684" and insert --Wt. of specimen = 694--.

In column 6, Table 5, Column 'Location A', line 29, delete "1.0g9" and insert --1.09--.

In column 7, Table 6, Column 'Avg.', line 40, delete "1.3235" and insert --1.3935--.

In column 8, line 32, delete "adsorption" and insert --absorption--.

Signed and Sealed this

First Day of May, 2001

Attest:

NICHOLAS P. GODICI

*Attesting Officer*  *Acting Director of the United States Patent and Trademark Office*